United States Patent
Miller

(10) Patent No.: US 12,214,710 B1
(45) Date of Patent: Feb. 4, 2025

(54) DEPLOYABLE LABORATORY ENVIRONMENT

(71) Applicant: Phillip C. Miller, Tempe, AZ (US)

(72) Inventor: Phillip C. Miller, Tempe, AZ (US)

(*) Notice: Subject to any disclaimer, the term of this patent is extended or adjusted under 35 U.S.C. 154(b) by 0 days.

(21) Appl. No.: 18/761,214

(22) Filed: Jul. 1, 2024

(51) Int. Cl.
*E04B 1/346* (2006.01)
*B60P 3/14* (2006.01)
*B60P 3/42* (2006.01)

(52) U.S. Cl.
CPC .. *B60P 3/14* (2013.01); *B60P 3/42* (2013.01)

(58) Field of Classification Search
CPC ..................................... B60P 3/14; B60P 3/42
USPC ............................................................. 52/65
See application file for complete search history.

(56) References Cited

U.S. PATENT DOCUMENTS

| | | | | |
|---|---|---|---|---|
| 4,949,093 A * | 8/1990 | Dhanjal | .................... | H01Q 3/46 343/755 |
| 5,001,494 A * | 3/1991 | Dorman | ............... | G01R 29/105 343/703 |
| 5,134,405 A * | 7/1992 | Ishihara | ............... | H05K 9/0001 342/4 |
| 5,401,901 A * | 3/1995 | Gerry | ........................ | B32B 7/12 174/391 |
| 5,833,294 A * | 11/1998 | Williams | .................. | B60S 5/00 296/24.32 |
| 5,864,991 A * | 2/1999 | Burns | ....................... | B60P 3/14 296/26.1 |
| 6,011,504 A | 1/2000 | Tan | | |
| 7,170,457 B2 | 1/2007 | Tsai | | |
| 8,530,756 B1 * | 9/2013 | Winch | ................. | H05K 9/0001 174/382 |
| 8,733,029 B2 * | 5/2014 | Tiramani | .............. | E04B 1/3442 52/79.8 |
| 8,776,446 B1 * | 7/2014 | Jhaveri | ..................... | E04H 3/02 52/234 |

(Continued)

FOREIGN PATENT DOCUMENTS

| | | |
|---|---|---|
| CN | 103057456 | 4/2013 |
| CN | 203198799 U | 9/2013 |

(Continued)

*Primary Examiner* — Basil S Katcheves
(74) *Attorney, Agent, or Firm* — Booth Udall Fuller, PLC; Pacer K. Udall

(57) ABSTRACT

A deployable laboratory environment is disclosed, including a foundation having a movement corridor, and a first and second module that each have a longitudinal axis and a junction side, the junction sides each having at least one opening framed by an interface. The modules are rotatably coupled to the foundation through swivel joints, at least one of which is able to translate along the movement corridor. The modules are movable between travel, intermediate, and deployed configurations. The travel configuration includes the longitudinal axes and the movement corridor being substantially parallel, and the openings being covered. The intermediate configuration includes the longitudinal axes being substantially perpendicular to the movement corridor, the junction sides facing each other, and the openings uncovered. The deployed configuration includes the modules coupled to each other with the interfaces joined and the module interiors combined into compartments which are shielded sufficient to meet an EMC testing standard.

20 Claims, 7 Drawing Sheets

(56) References Cited

U.S. PATENT DOCUMENTS

| | | | |
|---|---|---|---|
| 8,844,206 B2* | 9/2014 | Johnstone | B60P 3/0252 |
| | | | 52/79.5 |
| 9,029,714 B2* | 5/2015 | Winch | H05K 9/0001 |
| | | | 174/382 |
| 9,067,721 B2* | 6/2015 | Mullaney | E04H 1/1205 |
| 9,080,326 B2* | 7/2015 | Johnson | E04H 15/54 |
| 11,579,177 B2 | 2/2023 | Gerten | |
| 2011/0297675 A1* | 12/2011 | Johnson | B60P 3/14 |
| | | | 220/8 |
| 2013/0017023 A1* | 1/2013 | Nicholls | B29B 17/02 |
| | | | 406/39 |

FOREIGN PATENT DOCUMENTS

| | | |
|---|---|---|
| CN | 204008896 U | 12/2014 |
| CN | 104764944 | 7/2015 |
| CN | 110988555 | 4/2020 |
| CN | 217981677 U | 12/2022 |
| CN | 218213236 U | 1/2023 |
| CN | 218630039 U | 3/2023 |
| EP | 4276479 | 11/2023 |

* cited by examiner

DEPLOYABLE LABORATORY ENVIRONMENT

TECHNICAL FIELD

Aspects of this document relate generally to electromagnetic compatibility (EMC) testing, EMC testing enclosures, Telecommunications and Electrical Machinery Protected from Emanations Security (TEMPEST) facilities, and other laboratory environments

BACKGROUND

Various modern technologies and industries require laboratory environments or enclosures with very specific characteristics to perform technology- or industry-specific measurements or evaluation. These laboratories are often expensive to construct and maintain. For example, a critical step in the development of electronic or electrical devices is to ensure that the device meets the necessary electromagnetic compatibility (EMC) standards. Testing for EMC requires a suitable testing chamber that is standard compliant. Appropriate testing chambers with the necessary shielding and equipment are prohibitively expensive for all but the largest of institutions, with costs in the millions of dollars. In addition to the cost of building and staffing these facilities being outside the means of smaller institutions, the amount of use needed to justify such an expense can be hard for a small or mid-size business to generate. Although EMC testing is critical during product development, depending on the number of products being developed these EMC testing chambers may sit unused for extended periods of time.

The alternatives to building and staffing an on-site testing facility are to either forego pre-compliance testing and incur the expense of repeated attempts at successful compliance tests, or to incur the expense, in both time and money, of having the test done at another facility. The delay of sending the device back and forth slows the iterative process of refining the design to a crawl.

Another example of the burden of industry-specific enclosures is secure environments. Data and information sharing centers with classified or sensitive use shielded enclosures for classified or sensitive data require a TEMPEST or similarly certified enclosure. These enclosures are typically built on-site, and are expensive to design and construct. Furthermore, these enclosures have extensive testing requirements, an ongoing expense after construction. The locations where these facilities are needed is fluid and constantly changing, meaning that when a new geographic requirement is identified, extensive construction and testing must be undertaken before the facility is available for use.

Yet another example are laboratory environments for activities which require a sterile and/or low-particle laboratory, where a sealed enclosure is critical. These laboratories must be constructed with strict environmental controls and certifications. In situations where the testing need is immediate, such as medical testing for a large population across a large geographic area, the time to build and certify the labs is an obstacle to adding the capacity. This leads to a reliance on mail-in testing and the accompanying delays and shipping risks.

SUMMARY

According to one aspect, a deployable laboratory environment includes a foundation having a movement corridor, and a first module and a second module that are each a partial shell with an interior and an exterior. The first module has a first longitudinal axis and a first junction side with at least one opening framed by a first interface. The second module has a second longitudinal axis and a second junction side with at least one opening framed by a second interface. The first module is rotatably coupled to the foundation through a first swivel joint. The second module is rotatably coupled to the foundation through a second swivel joint. At least one of the first swivel joint and the second swivel joint is moveably coupled to the foundation and able to translate linearly along the movement corridor. The first module and the second module are movable between a travel configuration and an intermediate configuration, and between the intermediate configuration and a deployed configuration. The travel configuration includes the first longitudinal axis, the second longitudinal axis, and the movement corridor being substantially parallel to each other, the at least one opening of the first junction side being covered such that the interior of the first module is enclosed, and the at least one opening of the second junction side being covered such that the interior of the second module is enclosed. The intermediate configuration includes the first longitudinal axis and the second longitudinal axis both being substantially perpendicular to the movement corridor, the first junction side and the second junction side facing each other, and the interior of the first module and the second module being exposed. The deployed configuration includes the first module being releasably coupled to the second module such that the first interface is joined with the second interface and the interiors of the first module and the second module are combined and partitioned into a measurement compartment and an instrumentation compartment which are both shielded sufficient to meet an EMC testing standard.

Particular embodiments may comprise one or more of the following features. The deployable laboratory environment may also include a first weather cover moveably coupled to the first module and a second weather cover moveably coupled to the second module. The first weather cover and the second weather cover may be movable between the travel configuration and the intermediate configuration, and between the intermediate configuration and the deployed configuration. The travel configuration may include the first weather cover covering the at least one opening of the first junction side such that the interior of the first module is enclosed, and the second weather cover covering the at least one opening of the second junction side such that the interior of the second module is enclosed. The intermediate configuration and the deployed configuration may each include the first weather cover moved away from the at least one opening of the first junction side such that the interior of the first module is exposed and the first interface is unobstructed by the first weather cover, as well as the second weather cover moved away from the at least one opening of the second junction side such that the interior of the second module is exposed and the second interface is unobstructed by the second weather cover. The first weather cover may be moveably coupled to the first module through four pivot arms. The second weather cover may be moveably coupled to the second module through four pivot arms. The intermediate configuration may include the first weather cover positioned above the first module, and the second weather cover positioned above the second module. The deployed configuration may include the first weather cover positioned above the first module and sloped, the second weather cover positioned above the second module and sloped, and the first weather cover coupled to the second weather cover to form a roof above and covering at least the first junction side and the second junction side. The measurement compartment and the instrumentation compartment may each include the interiors of the first module and the second module. The first swivel joint and the second swivel joint may be both moveably coupled to the foundation and able to translate linearly along the movement corridor. The measurement compartment may be a reverberation chamber and may include at least one mode stirring device. The measurement compartment may be one of an anechoic chamber and a semi-anechoic chamber, the measurement compartment being lined with an absorber. One of the first module and the second module may include a power receptacle configured to be communicatively coupled to an external power source, the power receptacle providing electricity through a power filtering system to the measurement compartment and the instrumentation compartment. The deployable laboratory environment may also include a photovoltaic power system, the photovoltaic power system having at least one photovoltaic cell and a battery. The movement corridor may include at least one rail and at least one of the first swivel joint and the second swivel joint may be slidably coupled to the at least one rail of the movement corridor. The deployable laboratory environment may also include an environmental control system configured to control at least one of a temperature and a humidity level within the instrumentation compartment and the measurement compartment. The deployable laboratory environment may also include at most one external door, the external door leading into the instrumentation compartment when the first module and the second module are in the deployed configuration. The foundation may be a wheeled trailer. The deployable laboratory environment may have a width of at most 8.5 feet and a height of at most 13.5 feet when the first module and the second module are in the travel configuration.

According to another aspect of the disclosure, a deployable laboratory environment includes a foundation having a movement corridor, and a first module and a second module that are each a partial shell with an interior and an exterior. The first module has a first longitudinal axis and a first junction side with at least one opening framed by a first interface. The second module has a second longitudinal axis and a second junction side with at least one opening framed by a second interface. The deployable laboratory environment also includes a first weather cover moveably coupled to the first module through four pivot arms and a second weather cover moveably coupled to the second module through four pivot arms. The first module is rotatably coupled to the foundation through a first swivel joint, the second module is rotatably coupled to the foundation through a second swivel joint, and at least one of the first swivel joint and the second swivel joint is moveably coupled to the foundation and able to translate linearly along the movement corridor. The first module, the first weather cover, the second module, and the second weather cover are movable between a travel configuration and an intermediate configuration, and between the intermediate configuration and a deployed configuration. The travel configuration includes the first longitudinal axis, the second longitudinal axis, and the movement corridor being substantially parallel to each other, the first weather cover covering the at least one opening of the first junction side such that the interior of the first module is enclosed, and the second weather cover covering the at least one opening of the second junction side such that the interior of the second module is enclosed. The intermediate configuration includes the first longitudinal axis and the second longitudinal axis both being substantially perpendicular to the movement corridor, the first junction side and the second junction side facing each other, the first weather cover moved away from the at least one opening of the first junction side and positioned above the first module such that the interior of the first module is exposed and the first interface is unobstructed by the first weather cover, and the second weather cover moved away from the at least one opening of the second junction side and positioned above the second module such that the interior of the second module is exposed and the second interface is unobstructed by the second weather cover. The deployed configuration includes the first module being releasably coupled to the second module such that the first interface is joined with the second interface and the interiors of the first module and the second module are combined and partitioned into a measurement compartment and an instrumentation compartment which are both shielded sufficient to meet an EMC testing standard. The deployed configuration also includes the first weather cover positioned above the first module and sloped, the second weather cover positioned above the second module and sloped, and the first weather cover coupled to the second weather cover to form a roof above and covering at least the first junction side and the second junction side. The foundation is a wheeled trailer. The deployable laboratory environment has a width of at most 8.5 feet and a height of at most 13.5 feet when the first module and the second module are in the travel configuration.

Particular embodiments may comprise one or more of the following features. The first swivel joint and the second swivel joint may be both moveably coupled to the foundation and able to translate linearly along the movement corridor. The measurement compartment may be a reverberation chamber and may include at least one mode stirring device. The measurement compartment may be one of an anechoic chamber and a semi-anechoic chamber, the measurement compartment being lined with an absorber. The deployable laboratory environment may also include a photovoltaic power system, the photovoltaic power system having at least one photovoltaic cell and a battery. The movement corridor may include at least one rail and at least one of the first swivel joint and the second swivel joint may be slidably coupled to the at least one rail of the movement corridor.

Aspects and implementations of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred implementations, but in addition, include any and all structures, materials or acts that perform the claimed function as described in alternative implementations or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1A:
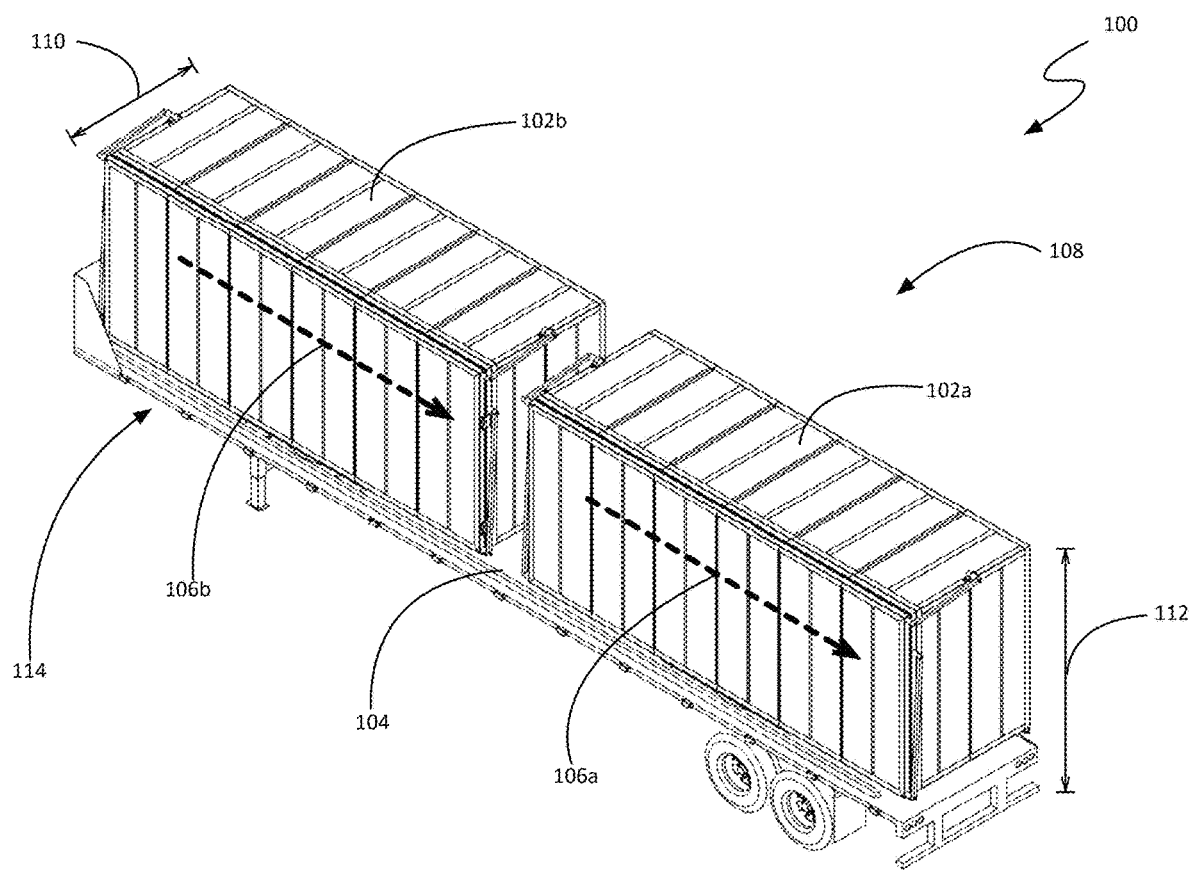
FIG. 1A shows a perspective view of a deployable EMC testing laboratory in a travel configuration.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

A critical step in the development of electronic or electrical devices is to ensure that the device meets the necessary electromagnetic compatibility (EMC) standards. Testing for EMC requires a suitable testing chamber that is standard compliant. Appropriate testing chambers with the necessary shielding and equipment are prohibitively expensive for all but the largest of institutions, with costs in the millions of dollars. In addition to the cost of building and staffing these facilities being outside the means of smaller institutions, the amount of use needed to justify such an expense can be hard for a small or mid-size business to generate. Although EMC testing is critical during product development, depending on the number of products being developed these EMC testing chambers may sit unused for extended periods of time.

The alternatives to building and staffing an on-site testing facility are to either forego pre-compliance testing and incur the expense of repeated attempts at successful compliance tests, or to incur the expense, in both time and money, of having the test done at another facility. The delay of sending the device back and forth slows the iterative process of refining the design to a crawl.

Contemplated herein is a deployable laboratory environment that can be deployed at a location and fill a need that would otherwise require either the construction of laboratory facilities on-site, or contracting with and traveling to another facility. The contemplated deployable laboratory environment is mobile, able to be transported as a conventional semitruck trailer, according to various implementations. Once the deployable laboratory environment (or DLE) reaches the intended location of measurement, two modules are reoriented on the wheeled transport to form one shielded enclosure. Once measurements have been performed, the two modules may be disconnected, and reconfigured for transport. In some embodiments, multiple trailers and modules may be oriented to provide larger enclosures.

According to various implementations, the contemplated DLE is sized to travel on standard roads, and interface with standard shipping facilities. For example, in one implementation, the two modules and their foundation can be positioned in a parking lot, or even interface with a standard shipping dock. Unlike standard shipping containers, the DLE can expand to a practical size, creating more useable space for performing the measurements. The transformation between a deployed configuration and the travel configuration is quick, and the deployable laboratory environment is able to be sent to any location in a fraction of the time needed to handle off-site testing using traditional methods.

The deployable laboratory environment disclosed herein is a cost-effective alternative to setting up a permanent semi-anechoic or reverberation testing chamber. According to various implementations, the DLE provides a testing platform to perform a complete suite of EMC measurements including, but not limited to, conducted emissions (CE), radiated emissions (RE), conducted susceptibility/immunity (CS/CI), Surge Susceptibility/Immunity, Electrically-Fast Transient (EFT) Susceptibility/Immunity, Magnetic Field Susceptibility/Immunity, Electrostatic Discharge (ESD) Susceptibility/Immunity and radiated susceptibility/immunity (RS/RI) to user specifications in a variety of industry sectors, including, but not limited to aerospace, building, communications, consumer, military, medical and transportation sectors. The deployable laboratory environment, when delivered and the modules connected, provides a turnkey solution equipped with all necessary shielding and equipment to conduct EMC testing.

The deployable laboratory environment is equipped with electromagnetic and environmental sealing to ensure high-quality testing in a controlled environment. It is configured to be resistant to environmental conditions present at the measurement site, including, but not limited to rainfall, snow, dust, and sand. In some implementations, the testing enclosure is equipped with environmental controls including appropriate HVAC systems, air flow control and filtration system, and humidifiers and/or dehumidifiers. The enclosure provides for a stable, consistent, measurement platform regardless of the environment.

It should be noted that while the following discussion is focused on implementations of the contemplated deployable laboratory environment that are configured for EMC testing, the problems noted above extend well beyond pre-compliance testing of electronic devices. There are numerous examples of other industries with periodic need of specialized facilities that would be too expensive to construct and staff, and which are also impractical to use off site. Accordingly, other implementations of the contemplated deployable laboratory environment may be adapted to fill these needs.

According to various implementations, the deployable laboratory environment may be configured to serve as a Sensitive Compartmented Information Facility (SCIF) or TEMPEST facility, a facility designed to prevent electronic eavesdropping and secure highly sensitive data. Some implementations may comprise one or more mode stirrers to help in evenly distributing electromagnetic fields within the enclosure. Additionally, appropriate input/output (IO) filters and electromagnetic mode-stirring methods ensure that all electronic signals entering or leaving the SCIF are properly filtered to prevent data leaks.

According to various implementations, the deployable laboratory environment may be configured to serve as a cleanroom for use in research and manufacturing processes that can be adversely affected by small particles, such as semiconductor fabrication, biotechnology, or pharmaceutical production. In some implementations, such a configuration may make use of a laminar air flow system (e.g., laminar flow hoods, laminar flow rooms, etc.) that directs air in a consistent, unidirectional flow, reducing turbulence and the likelihood of particle contamination. Some implementations may use HEPA filters to remove contaminants (e.g., dust, airborne microbes, aerosol particles, chemical vapors, etc.) from the air, thereby maintaining a very low level of particulates within the room.

According to various implementations, the deployable laboratory environment may be configured to serve as a Variable Impedance Radio Chamber (VIRC), where at least one of the walls or ceiling is a flexible conductive material. Using flexible conductive materials for walls or ceilings can create an adjustable electromagnetic environment within the mobile lab for simulating different testing environments and ensuring that devices operate safely under various electronic conditions.

According to various implementations, the deployable laboratory environment may be configured to serve as a laboratory for evaluating materials, products, and/or devices in various climates. In some implementations, the contemplated environment may comprise systems to control temperature, humidity, pressure, and other atmospheric conditions. By simulating different climates, researchers can understand how materials, products, and/or devices will perform in diverse environments around the world.

According to various implementations, the deployable laboratory environment may be configured to serve as an automotive testing lab. Some implementations may comprise a door configured to admit an automobile or automotive components, as well as testing equipment such as a dynamometer to measure the power output of engines, motors, or complete vehicles in controlled conditions.

Other examples include, but are not limited to, biological or medical testing (e.g., blood testing, etc.), forensics laboratories (e.g., rather than reconstructing a scene or crash site elsewhere), as well as combinations of these or any other testing environments known in the art.

Other implementations may be adapted for use outside of testing or laboratory activities, for uses that need an environment with specific requirements and having specific equipment that is typically not easy to assemble on a temporary basis. As a specific example, in one implementation, the deployable laboratory environment may be configured for use as a medical operating room that is configured for quick sterilization and equipped with large surgical equipment (e.g., lighting, surgical table, monitoring and imaging devices, gas supplies, refrigeration, filtration, life support, etc.) that would otherwise be difficult to transport to conventional temporary medical sites.

Figure 1B:
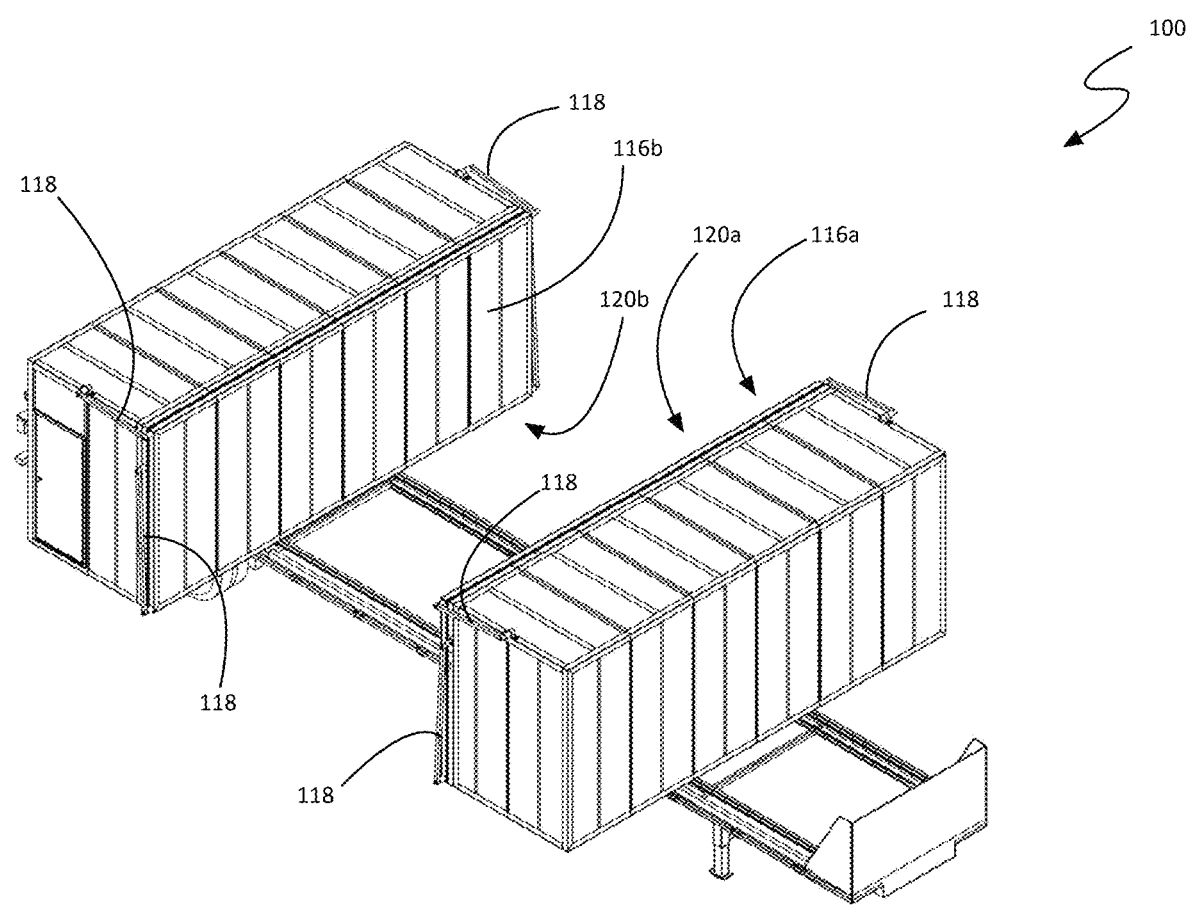
FIG. 1B shows a perspective view of a deployable EMC testing laboratory in transition between the travel configuration and an intermediate configuration.
Figure 1C:
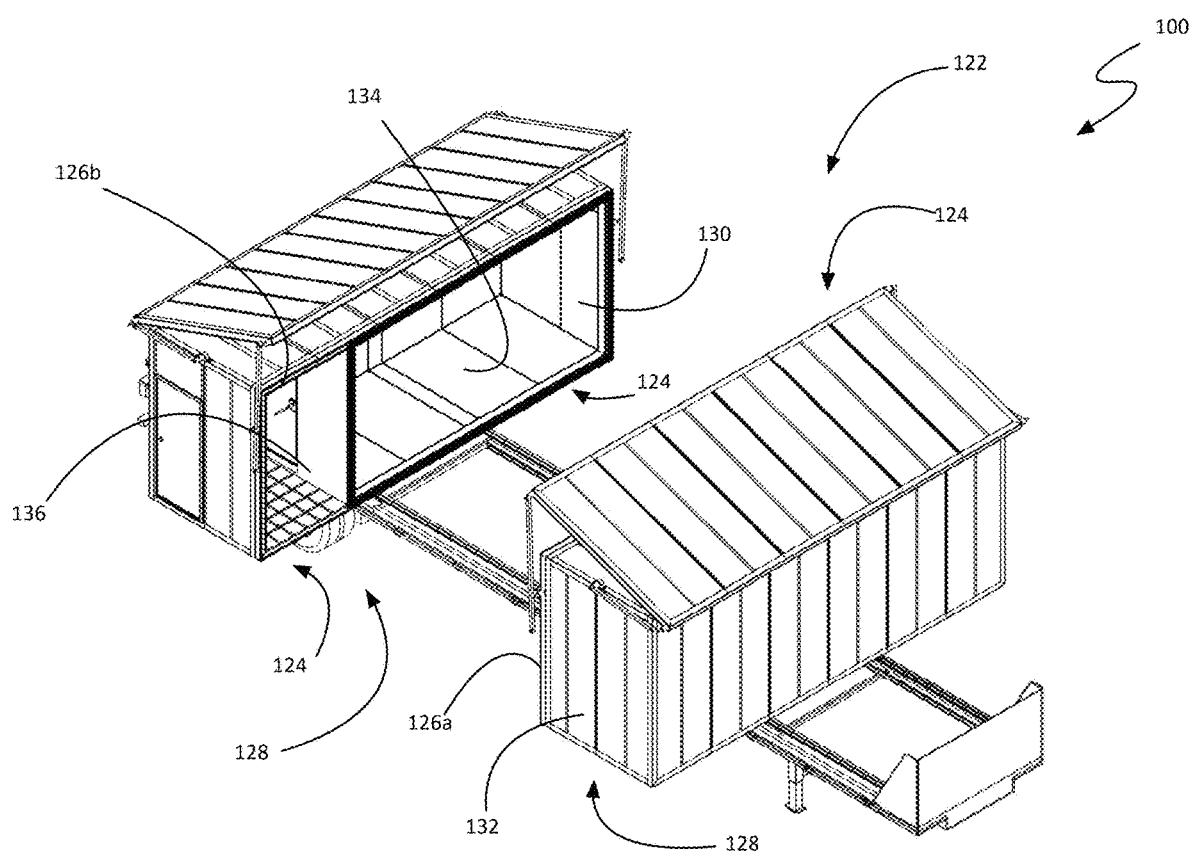
FIG. 1C shows a perspective view of a deployable EMC testing laboratory in the intermediate configuration.
Figure 1D:
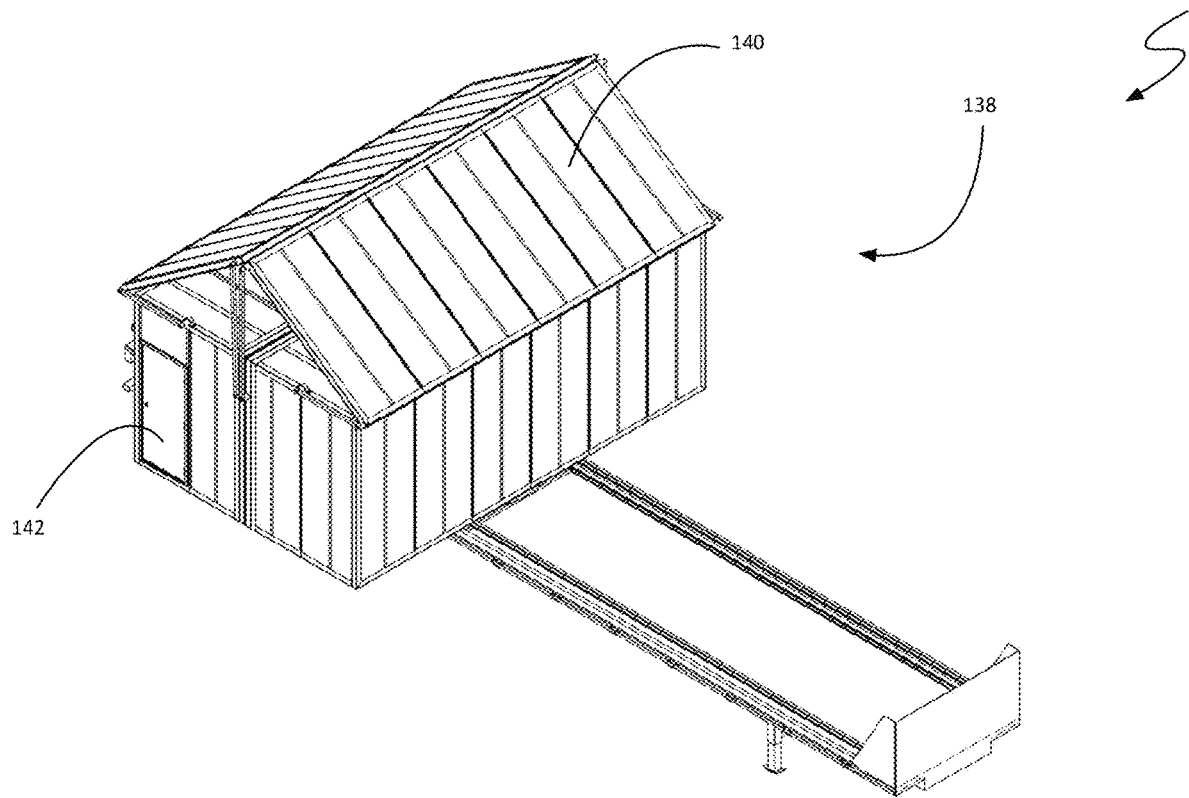
FIG. 1D shows a perspective view of a deployable EMC testing laboratory in a deployed configuration.

FIGS. 1A-1D are perspective views of a non-limiting example of a deployable laboratory environment 100 in various configurations. Specifically, FIG. 1A shows the DLE 100 in a travel configuration 108 and FIG. 1B shows it in transition between the travel configuration 108 and an intermediate configuration 122. FIG. 1C shows the DLE 100 in an intermediate configuration 122, and FIG. 1D shows it in a deployed configuration 138. According to various implementations, DLE 100 comprises a first module 102a, a second module 102b, and a foundation 104. Each will be discussed in turn.

As shown, the DLE 100 comprises two modules, a first module 102a and a second module 102b. Each module is a rigid structure, a partial shell 128 that has an interior 130 and an exterior 132. Apart, these modules are able to be transported to a location in need of laboratory facilities. When joined together, the first module 102a and the second module 102b form an enclosed environment that can be configured for a wide range of uses. Again, while much of the following discussion is done in the context of the DLE 100 being used for EMC testing, other implementations may be configured for a wide range of other research, testing, characterization, manufacturing, prototyping, and the like.

In some implementations, these individual modules may be constructed in a manner similar to standardized steel shipping containers. In other implementations, the modules 102 may be actual shipping containers that have been retrofit to operate as contemplated herein. In still other implementations, the first module 102a and the second module 102b may be of new construction that is specific to the intended use.

Each module has a junction side, meaning the side of the module that will interface with the other module when in the deployed configuration. Specifically, the first module 102a has a first junction side 120a and the second module 102b has a second junction side 120b. Each junction side has at least one opening 124, meaning a portal between the exterior 132 and the interior 130 of the module. For example, in FIG. 1C the second junction side 120b of the second module 102b is exposed, showing that there are two openings, due to the partitioning of the interior 130 into a measurement compartment 134 and an instrumentation compartment 136 that span across the union of the two modules, according to some implementations.

At each junction side, the at least one opening 124 is framed by an interface. Specifically, the first junction side 120a has at least one opening 124 that is framed by a first interface 126a, and the second junction side 120b has at least one opening 124 that is framed by a second interface 126b. These interfaces are the parts of the modules that interlock, overlap, or otherwise interact with each other when the modules are put into the deployed configuration 138 such that the two modules are sealed together in a manner sufficient for the intended use of the DLE. For example, in implementations where the DLE 100 is configured for use in EMC testing, the first interface 126a and the second interface 126b will seal together sufficient to prevent any intrusion of the environment (e.g., rain, snow, dust, heat, wind, etc.) or any leakage of electromagnetic signals or noise, into or out of the chamber, that could interfere with the EMC testing.

With this definition in mind, it is important to recognize that "framed" may have a different meaning, depending on the intended use of the DLE 100. For example, in an implementation where the DLE 100 is configured with a dynamometer to measure the power output of an engine, it may be appropriate for the interfaces 126 to frame the openings 124 on only the top edge and the sides, allowing the bottom edge to simply press together or allowing a gap. The guiding factor of what is intended by the term "framed" is that the resulting interface between the two modules 102 is sufficient for the intended use of the modules 102, or is able to be modified to make the seal between the two modules 102 sufficient (e.g., addition of a sealing strip, etc.).

When the DLE 100 is in the deployed configuration 138, the two modules are coupled to each other, with the first junction side 120a attached to the second junction side 120b to form an enclosure. When in the travel configuration 108, the at least one opening 124 on the junction side 120 of each module is covered such that the interior 130 of the module is enclosed. According to various implementations, the cleanliness and integrity of the interior 130 of the modules, and any instrumentation stored or installed therein, needs to be maintained during travel. As such, the open sides of the modules are configured to be covered for travel.

According to various implementations, each module may have a weather cover sized to fit and cover the opening(s) in the junction side. In some implementations, these covers may be removable, while in others they may remain attached. To be more specific, in some implementations, the deployable laboratory environment 100 may comprise a first weather cover 116a moveably coupled to the first module 102a and a second weather cover 116b moveably coupled to the second module 102b. In some implementations, these weather covers 116 may simply swing on a hinge, moving out of the way during the coupling process. In other implementations, they may pivot upwards, each stored above its module.

In some implementations, the weather covers 116 may serve a different purpose when the DLE 100 is not in the travel configuration 108. For example, as shown in FIGS. 1C and 1D, in some implementations the weather covers 116a, 116b may be used to form a sloped roof 140 over the modules, providing additional protection against the elements, beyond whatever seal exists between the first interface 126a and the second interface 126b.

There are a number of ways to couple the weather covers 116 to their modules 102. As a specific, non-limiting example, and as shown in FIGS. 1A-1D, in some implementations these covers may be attached to the modules through pivot arms 118. Specifically, the first weather cover 116a is moveably coupled to the first module 102a through four pivot arms 118, and the second weather cover 116b is moveably coupled to the second module 102b through four pivot arms 118, according to various implementations. The pivot arms attach to fixed points on the weather covers, where they are able to pivot. The other end of the arms are attached to the modules, where they are able to pivot and slide along a track.

In the specific, non-limiting example shown in FIGS. 1A-1D, each pivot arm 118 of the four pivot arms 118 attached to the first module 102a is pivotably coupled to the first weather cover 116a at one end. The other end of those pivot arms 118 is pivotably and slidably coupled to the first module 102a. The same arrangement can be seen for the other pivot arms 118, the second module 102b, and second weather cover 116b. These pivot arms 118 provide stability to the weather covers 116, both in the travel configuration 108 and in the deployed configuration 138 where the weather covers 116 serve as a roof 140.

The first module 102a and the second module 102b are moveably coupled to a foundation 104. In the context of the present description and the claims that follow, a foundation 104 is a structure that permits and possibly facilitates the movement of the modules 102 relative to each other (i.e., from one configuration to another).

One of the advantages of the contemplated DLE 100 design is its ease of transportation using conventional methods. In some implementations, the foundation 104 may itself be capable of transportation. For example, in some implementations, the foundation 104 may be a wheeled trailer 114, able to be pulled by or otherwise operatively connected to a truck such as a semi-truck. In other implementations, the foundation 104 may be part of, or integral with, a vehicle, such as a large truck or ship. In still other implementations, the foundation 104 may simply be a structure upon which the first module 102a and the second module 102b can move, and is itself configured to be loaded onto and unloaded from a standard shipping means (e.g., on a trailer flatbed, on a railcar, on a cargo ship, etc.).

According to various implementations, the first module 102a is rotatably coupled to the foundation 104, the second module 102b is rotatably coupled to the foundation 104, and at least one of the first module 102a and the second module 102b is moveably coupled to the foundation 104 and able to translate linearly along the foundation 104. In some implementations, the first module 102a and second module 102b are rotatably coupled to the foundation 104 through swivel joints. The coupling between the foundation 104 and the modules 102a, 102b will be discussed in greater detail with respect to FIG. 2 below.

One of the advantages of the contemplated deployable laboratory environment 100 is that it can be transported using conventional means. For example, in some implementations the foundation 104 is a wheeled trailer 114. When in the travel configuration 108 (shown in FIG. 1A), the modules 102 and foundation 104 may be sized to be essentially the size of a standard commercial trailer. As a specific example, in one implementation, the DLE 100 has a width 110 of at most 8.5 feet and a height 112 of at most 13.5 feet when the first module 102a and the second module 102b are in the travel configuration 108. This allows the DLE 100 to be transported on roads, taken through standard shipping doors, and all other activities available to those standard sized containers and trailers. In other implementations, the DLE 100 may have other dimensions, with the intention of utilizing other means of travel such as ship or train.

According to various implementations, the first module 102a and the second module 102b may themselves be less than half the length of the foundation 104. In some implementations, they may be roughly equal to half the length of the foundation 104, and are able to spread apart linearly before rotating into the intermediate configuration 122 to allow room.

In an effort to clarify the following discussion of the different configurations of the first module 102a, the second module 102b, and the foundation 104, the concept of a longitudinal axis will be used. In the context of the present description and the claims that follow, a longitudinal axis is defined as the axis that extends from one end of a three dimensional object to the other, along its greatest length. This axis aligns with the primary direction of the object's elongation, or its most extended dimension, and often is also the axis of greatest symmetry. As shown, the first module 102a has a first longitudinal axis 106a, the second module 102b has a second longitudinal axis 106b, and the foundation 104 has a foundation longitudinal axis (see axis 206 of FIG. 2). As will be discussed in the context of FIG. 2, the foundation 104 also has a movement corridor 200 that is parallel to the foundation longitudinal axis 206. In the following discussion of the relative orientation of the modules and the foundation in different configurations, reference may be made to this movement corridor 200 and/or the foundation longitudinal axis 206.

According to various implementations, the first module 102a and the second module 102b are movable between a travel configuration 108 and an intermediate configuration 122, and between the intermediate configuration 122 and a deployed configuration 138. Each of these configurations will be discussed in greater detail. Also, in some implementations, the first weather cover 116a and the second weather cover 116b are also movable between the travel configuration 108 and the intermediate configuration 122, and between the intermediate configuration 122 and the deployed configuration 138, as will be discussed below.

FIG. 1A shows a perspective view of a non-limiting example of a deployable laboratory environment 100 in a travel configuration 108. When in the travel configuration 108, the DLE 100 is ready to be transported to a different location. For example, in some implementations, including the non-limiting example shown in FIGS. 1A-1D, the DLE 100 may be configured to travel on roads, being pulled by a truck (e.g., the foundation 104 is a wheeled trailer 114, etc.). In these implementations, the travel configuration 108 comprises the DLE 100 having the size and shape necessary to safely and legally traverse roads. Other implementations that are configured to travel by different or additional means (e.g., train, ship, etc.) may have a travel configuration 108 with different constraints.

In general, however, the travel configuration 108 across many implementations configured for various methods of transportation has some common features. According to various implementations, the travel configuration 108 comprises the first longitudinal axis 106a of the first module 102a, the second longitudinal axis 106b of the second module 102b, and the movement corridor of the foundation 104 (see movement corridor 200 of FIG. 2) being substantially parallel to each other. It may also be said that the travel configuration 108 comprises the first longitudinal axis 106a, the second longitudinal axis 106b, and the foundation longitudinal axis 206 of the foundation 104 (see axis 206 of FIG. 2) being substantially parallel to each other. The movement corridor 200 and foundation longitudinal axis 206 will be discussed further in the context of FIG. 2, below.

In the context of the present description and the claims that follow, "substantially parallel" means the two items being compared relative to each other are closer to parallel than to perpendicular. As seen in the non-limiting example of FIG. 1A, the travel configuration 108 comprises the first module 102a, the second module 102b, and the foundation 104 all being aligned, reducing the cross-section of the DLE 100 to essentially that of a standard semi-trailer.

In some implementations, the travel configuration 108 also comprises the first module 102a and the second module 102b being separated from each other by a gap, as shown in FIG. 1A. As will be discussed, there needs to be a space between the two modules at some point in the transition from travel configuration 108 to deployed configuration 138, to allow the rotation of one module relative to another. In some implementations, the first module 102a and the second module 102b may be separated by a gap when in the travel configuration 108. In other implementations, the travel configuration 108 may comprise the first module 102a and second module 102b being too close to allow the needed relative rotation, requiring a linear relative movement of one of the modules before the transition into the intermediate configuration 122 is complete.

In some implementations, the DLE 100 may comprise equipment (e.g., sensors, devices, monitors, etc.) related to the intended purpose of the DLE 100 (e.g., equipment needed for EMC testing, etc.). According to various implementations, the travel configuration 108 may further comprise any such equipment within either module being stowed/secured for travel, to prevent damage. Those skilled in the art will recognize there are myriad ways to secure the various devices that might be used in such a laboratory environment.

As previously discussed, the first module 102a and the second module 102b each have at least one opening 124 on their junction side 120. According to various implementations, the travel configuration 108 comprises the at least one opening 124 of the first junction side 120a being covered such that the interior 130 of the first module 102a is enclosed, and the same for the at least one opening 124 of the second junction side 120b, to protect the interiors 130 and any equipment stored therein. In some implementations, including the non-limiting example shown in FIGS. 1A-1D, these openings may be covered by weather covers (i.e., the first weather cover 116a and the second weather cover 116b).

FIG. 1B shows a perspective view of a non-limiting example of a deployable laboratory environment 100 in transition between the travel configuration 108 and an intermediate configuration 122. According to various implementations, the transition from the travel configuration 108 to the intermediate configuration 122 (on the way to the deployed configuration 138) begins with securing the DLE 100. The DLE 100, when in travel configuration 108, is meant to be ready for transportation. That mobility should be removed early in the transitioning process, to prevent injury or damage.

According to various implementations, the foundation 104 may comprise various elements meant to stabilize the DLE 100, and hold it in the desired position relative to its surroundings. For example, in some implementations where the foundation 104 is a wheeled trailer 114, the foundation 104 may comprise one or more trailer support legs or support jacks near the front which can be extended to ensure the trailer is level and stable, after which the foundation 104 is disconnected from the transport truck. Those skilled in the art will recognize that the stabilization of a wheeled trailer 114 or other container/structure designed for transportation using conventional means (e.g., road, rail, waterways, etc.) is an endeavor that extends beyond the needs specific to the contemplated DLE 100, and that other stabilization and/or immobilization methods, devices, or techniques known in the art may be adapted for use with the DLE 100. Examples include, but are not limited to, wheel locks, stabilization feet, and the like.

As seen in FIG. 1B, at some point in the transition between the travel configuration 108 and the intermediate configuration 122, the first module 102a and the second module 102b are rotated, relative to the foundation 104. The degree and definition of this rotation will be discussed in the context of FIG. 1C, which shows a non-limiting example of the DLE 100 in an intermediate configuration 122. However, the rotation itself can be discussed here.

The transition between the travel configuration 108 and the intermediate configuration 122 comprises the rotation of the first module 102a and the second module 102b. In some implementations, this transition may also include the linear translation of one or both modules as well. For example, in implementations where the travel configuration 108 comprises the modules being close enough to each other that the rotation of one module is obstructed by the other module, one or both modules with be shifted along the foundation 104 at least until the rotation is possible.

According to various implementations, the rotation of the first module 102a and the second module 102b (and, in some implementations, the linear translation of one or both modules) can be accomplished manually, using a motorized system, using hydraulics, or using other methods known in the art. The mechanism used in rotation and translation of the two chamber halves is designed and constructed in such as manner so as to ensure accurate, repeatable positioning of the two halves of the deployable laboratory environment 100. In some implementations making use of an electric motor, the motor itself may be positioned away from the pivot point of a module and make use of chain(s), gears, or belt(s) to transfer the force, in an effort to further isolate the eventual laboratory chamber from the fields associated with an electric motor.

The first module 102a and the second module 102b are rotated relative to the foundation 104 until they are oriented such that the first junction side 120a of the first module 102a and the second junction side 120b of the second module 102b are facing each other. The intermediate configuration 122 will be defined using a narrower definition of the relative orientation of the modules, below.

FIG. 1C shows a perspective view of a non-limiting example of a deployable laboratory environment 100 in the intermediate configuration 122. According to various implementations, the intermediate configuration 122 comprises the first module 102a and second module 102b being rotated into the relative orientation they will have when in the deployed configuration 138 and the various compartments within deployed DLE 100 are fully formed and useable. Put differently, according to various implementations the transition between the intermediate configuration 122 and the deployed configuration 138 does not contain any additional rotation of the modules relative to the foundation 104—only translation. More specifically, the intermediate configuration 122 comprises the first module 102a and second module 102b being rotated relative to the foundation 104 such that the first junction side 120a and the second junction side 120b are facing each other. Furthermore, the first longitudinal axis 106a and the second longitudinal axis 106b are substantially parallel to each other.

Additionally, when the first module 102a and the second module 102b are in the intermediate configuration 122, the first longitudinal axis 106a and the second longitudinal axis 106b are both substantially perpendicular to foundation 104. This may be described as the first longitudinal axis 106a and the second longitudinal axis 106b being substantially perpendicular to the path of linear translation of one or more modules relative to the foundation (i.e., the movement corridor 200 of FIG. 2). This could also be described as the first longitudinal axis 106a and the second longitudinal axis 106b being substantially perpendicular to the longitudinal axis of the foundation 104 (i.e., the foundation longitudinal axis 206 of FIG. 2). In the context of the present description and the claims that follow, two elements being "substantially perpendicular" to each other means they are closer to being perpendicular to each other than parallel.

As shown, the intermediate configuration 122 also comprises the interior 130 of the first module 102a and the second module 102b being exposed. More specifically, whatever is being used to cover the at least one opening 124 of the first junction side 120a and the second junction side 120b is moved such that the interiors 130 of the two modules are no longer enclosed and the interfaces 126 are not obstructed. In some implementations, the covering may be entirely removed. In other implementations, the covering may be moved while remaining coupled to the DLE 100.

In some implementations comprising a first weather cover 116a and a second weather cover 116b, including the non-limiting example shown in FIGS. 1A-1D, the intermediate configuration 122 comprises the first weather cover 116a being moved away from the at least one opening 124 of the first junction side 120a such that the interior 130 of the first module 102a is exposed and the first interface 126a is unobstructed by the first weather cover 116a. The intermediate configuration 122 may also comprise the second weather cover 116b being moved away from the at least one opening 124 of the second junction side 120b such that the interior 130 of the second module 102b is exposed and the second interface 126b is unobstructed by the second weather cover 116b. In some implementations, the exposure of the interiors 130 of the modules may occur after they have been rotated, in other implementations the exposure may occur before any rotation of the modules has occurred, and in still other implementations the exposure may occur while the rotation is taking place (i.e., the rotation has begun but is not complete).

In some implementations, the intermediate configuration 122 may also comprise the movement of the weather covers, relative to their modules, in anticipation of the deployed configuration 138. For example, in some implementations including the non-limiting example shown in FIGS. 1A-1D, the intermediate configuration 122 may comprise the first weather cover 116a being positioned above the first module 102a and the second weather cover 116b being positioned above the second module 102b.X FIG. 1D shows a perspective view of a non-limiting example of a deployable laboratory environment 100 in a deployed configuration 138. When in the deployed configuration 138, the DLE 100 is (at least structurally) ready for its intended use. More specifically, when in the deployed configuration 138, the first module 102a is releasably coupled to the second module 102b such that the first interface 126a is joined with the second interface 126b and the interiors 130 of the first module 102a and the second module 102b are combined to form at least one compartment that is sufficiently sealed from the outside environment that it's intended use may be carried out.

As previously discussed, the DLE 100 contemplated herein may be adapted for a wide range of uses, and each of those uses could be accomplished within a compartment that is arranged or configured in a variety of ways. Thus, while the following discussion is done in the context of a specific, non-limiting example of a DLE 100 configured for use in EMC testing, the details discussed (e.g., how the interior is partitioned, the accompanying equipment and subsystems, etc.) are meant to illustrate the versatility of the contemplated DLE 100, and should not be interpreted as limitations or absolute requirements.

According to various implementations, the deployed configuration 138 may comprise the interiors 130 of the first module 102a and the second module 102b being combined and partitioned into a measurement compartment 134 and an instrumentation compartment 136, which are both shielded sufficient to meet an EMC testing standard. See FIG. 1C, because in the deployed configuration 138 shown in FIG. 1D the measurement compartment 134 and instrumentation compartment 136 are enclosed within the releasably coupled modules. In some implementations, the measurement compartment 134 may be configured as a reverberation chamber, while in others it may be used as a semi-anechoic chamber. Various configurations and uses of the deployed DLE 100, specific to the non-limiting example of EMC testing, will be discussed in the context of FIGS. 3A and 3B, below.

The first module 102a and the second module 102b are able to move between the travel configuration 108 and the intermediate configuration 122, and between the intermediate configuration 122 and the deployed configuration 138, according to various implementations. In moving from the intermediate configuration 122 to the deployed configuration 138, at least one of the modules is translated along the foundation 104 such that the separation between the first module 102a and the second module 102b gets smaller, until the first interface 126a and the second interface 126b are joined together. In some implementations, only one of the modules is able to translate linearly, while in other implementations both modules can translate linearly.

Once a module is in position, it is locked in place, according to various implementations. In some implementations, this may be accomplished with a mechanism that is part of the movable/rotatable coupling between the module and the foundation 104 (e.g., a swivel joint, etc.). For example, in one implementation, the swivel joints may each comprise a brake or lock that, when engaged, arrests the movement of the swivel joint in at least one aspect (e.g. just rotating, just translating, both, etc.).

In other implementations, a module may be locked in place through a part of whatever mechanism actually drives or causes the movement (e.g., a motor, a hydraulic system, a manual crank, etc.). For example, a hydraulic piston may be locked in place, or a latch may prevent a hand crank from advancing or retreating when engaged.

In still other implementations, a module may be locked in place through a structure or mechanism that is coupled to said module but not part of the connection between the module and the foundation 104. For example, one or more "feet" may be extended from the bottom of a module near the distal ends that, when in contact with the ground, help level and stabilize the module as well as prevent it from translating or rotating.

The deployed configuration 138 also comprises the first module 102a being releasably coupled to the second module 102b, and sealed together sufficient to create an interior chamber that is sufficient for its intended use. There are a number of conventional mechanisms that are currently used to seal, for example, the doors of shipping containers or trailers, or to seal the doors of conventional EMC enclosures, that may be adapted for use with the DLE 100. In some implementations, the first interface 126a and the second interface 126b may be interleaved, with parts of one extending into the other such that there is not a straight pathway between the two. The joining of the two modules may be strengthened and the interior further isolated from the exterior using any method known in the art including, but not limited to, gaskets, leaves, and the like. Those skilled in the art will recognize that, depending on the intended use, the nature of the coupling between the first module 102a and the second module 102b may vary (e.g., only sealed on 3 sides, a water-tight seal, a hermetic seal, an air-tight seal able to withstand a large pressure differential between the outside and the inside, etc.).

In some implementations that include weather covers, including the non-limiting example shown in FIGS. 1A-1D, the weather covers may have a secondary use, in addition to enclosing the modules in the travel configuration 108 to protect the interiors 130. In some implementations, the deployed configuration 138 may include the first weather cover 116a and the second weather cover 116b being positioned above their respective modules, each sloped and coupled to each other to form a roof 140 above and covering at least the first junction side 120a and the second junction side 120b. This roof 140 provides additional environmental protection to the seal between the modules.

Once the DLE 100 has been used, the deployment process is reversed (i.e. moved from the deployed configuration 138 to the intermediate configuration 122 and from the intermediate configuration 122 to the travel configuration 108) and the DLE 100 is put back into the travel configuration 108, ready for transportation to another location. In some implementations, this may further comprise the stowing or removal of equipment within the chamber(s).

It should be noted that while the non-limiting example shown in FIGS. 1A-1D comprises two modules that interface with each other, in other implementations multiple sets of modules (each pair having its own foundation) may be joined to form even larger chambers.

Figure 2:
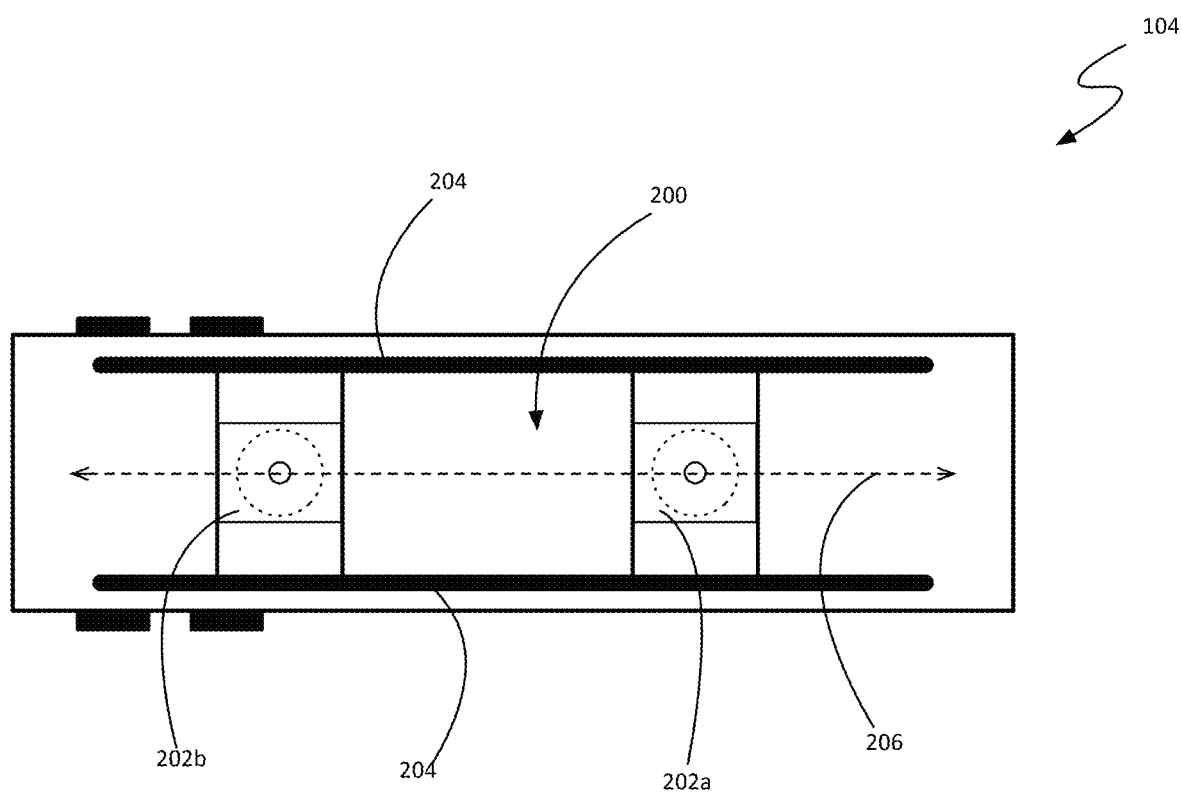
FIG. 2 shows a top view of a foundation of a deployable EMC testing laboratory.

FIG. 2 shows a top view of a non-limiting example of a foundation 104 of a deployable laboratory environment 100.

Also shown is a non-limiting example of the first swivel joint 202a and the second swivel joint 202b, through which the first module 102a and the second module 102b are coupled to the foundation 104.

According to various implementations, the first module 102a and the second module 102b (not shown) are rotatably coupled to the foundation 104 through a first swivel joint 202a and a second swivel joint 202b, respectively. Furthermore, at least one of the first swivel joint 202a and the second swivel joint 202b is moveably coupled to the foundation 104 and able to translate linearly along the movement corridor 200. In the context of the present description and the claims that follow, a movement corridor 200 is a portion of the foundation 104 within which the translation and rotation of modules takes place. The movement corridor 200 is substantially parallel to the foundation longitudinal axis 206, as shown.

In some implementations, including the non-limiting example shown in FIG. 2, the movement corridor 200 comprises at least one rail 204. For example, as shown, in some implementations the movement corridor 200 may comprise two rails 204. In some implementations, one or more rails 204 may run the length of the movement corridor 200, while in other implementations, one or more rails 204 may run along a portion of the movement corridor that one module will need to traverse or within which it will rotate, such that each module has its own rail 204 or rails 204 within the movement corridor 200, with no single rail 204 being shared by both modules. Depending on implementation factors such as the materials and rigidity of the foundation and the materials and design (e.g., custom, off the shelf, etc.) of the rails 204, one of these options may be favored over the other. In other implementations, one or both of the modules may translate along the movement corridor 200 on something other than one or more rails 204. Examples include, but are not limited to, one or more tracks, a flat or grooved surface adapted to receive wheels, a surface of reduced friction (e.g., lubricated, air-cushioned, etc.) on which another surface can slide, and the like.

In some implementations, each module may be is equipped with a brake to prevent movement along the movement corridor 200. For example, in some implementations using rails 204, each module that slides along those rails 204 may be equipped with a rail brake. In some implementations where a module rolls on wheels along the movement corridor 200 (e.g., bearing blocks on a rail, wheels on a track, wheels on a surface of the movement corridor 200, etc.), the module may be equipped with a hand brake that applies brake shoes to the wheels to prevent them from moving. Those skilled in the art will recognize that other mechanisms or methods used to prevent linear movement may be adapted for use with a module within the movement corridor 200.

The first module 102a and the second module 102b are both rotatably coupled to the foundation 104. As previously discussed, in some implementations both the first module 102a and the second module 102b are also able to translate along or within the movement corridor 200 as well. In other implementations, only one of the modules needs to, or is able to, translate linearly along the foundation 104. Much of the discussion herein is in the context of the non-limiting example depicted in FIGS. 1A-1D, where moving from the travel configuration 108 to the deployed configuration 138 (through the intermediate configuration 122) comprises both the first module 102a and the second module 102b rotating, but only the first module 102a moving linearly, translating down the foundation 104 to join with the second module 102b at the end of the wheeled trailer 114. However, it should be noted that in other implementations only the second swivel joint 202b may be able to translate, while in still other implementations both swivel joints are able to translate along the movement corridor 200, in addition to rotating.

In the context of the present description and the claims that follow, a swivel joint (i.e., first swivel joint 202a, second swivel joint 202b, etc.) is any mechanical component that allows two connected parts to rotate relative to each other around a common axis. It typically includes bearings and seals that facilitate smooth rotation and prevent leakage of any fluids passing through, if applicable. Swivel joints are used to enable relative movement in one or more planes while maintaining a continuous connection. In some implementations, at least one of the swivel joints is also able to translate along the movement corridor 200. This is possible because that swivel joint is slidably (or otherwise translatably) coupled to the foundation 104 and rotatably coupled to a module.

Figure 3A:
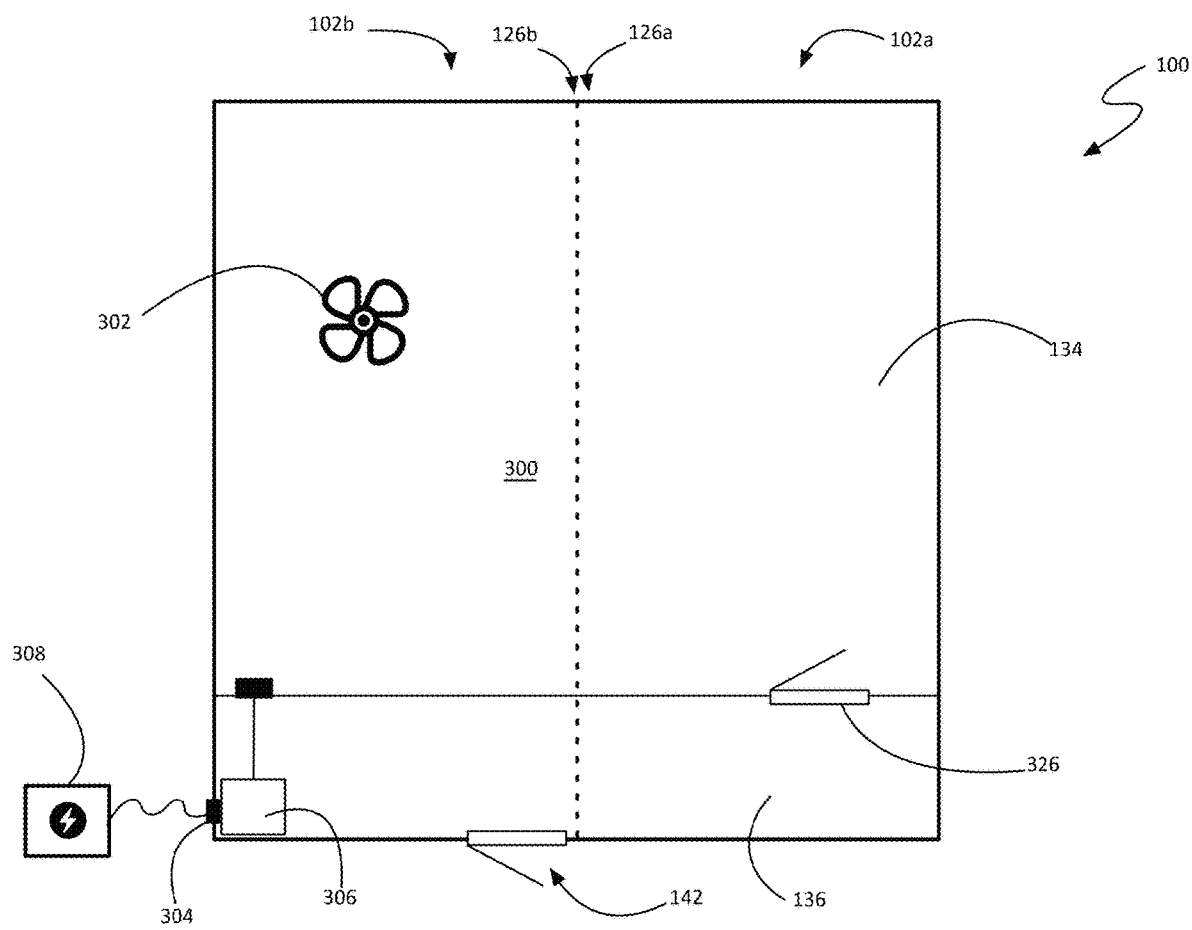
FIG. 3A shows a schematic top view of a deployable EMC testing laboratory with a reverberation chamber.
Figure 3B:
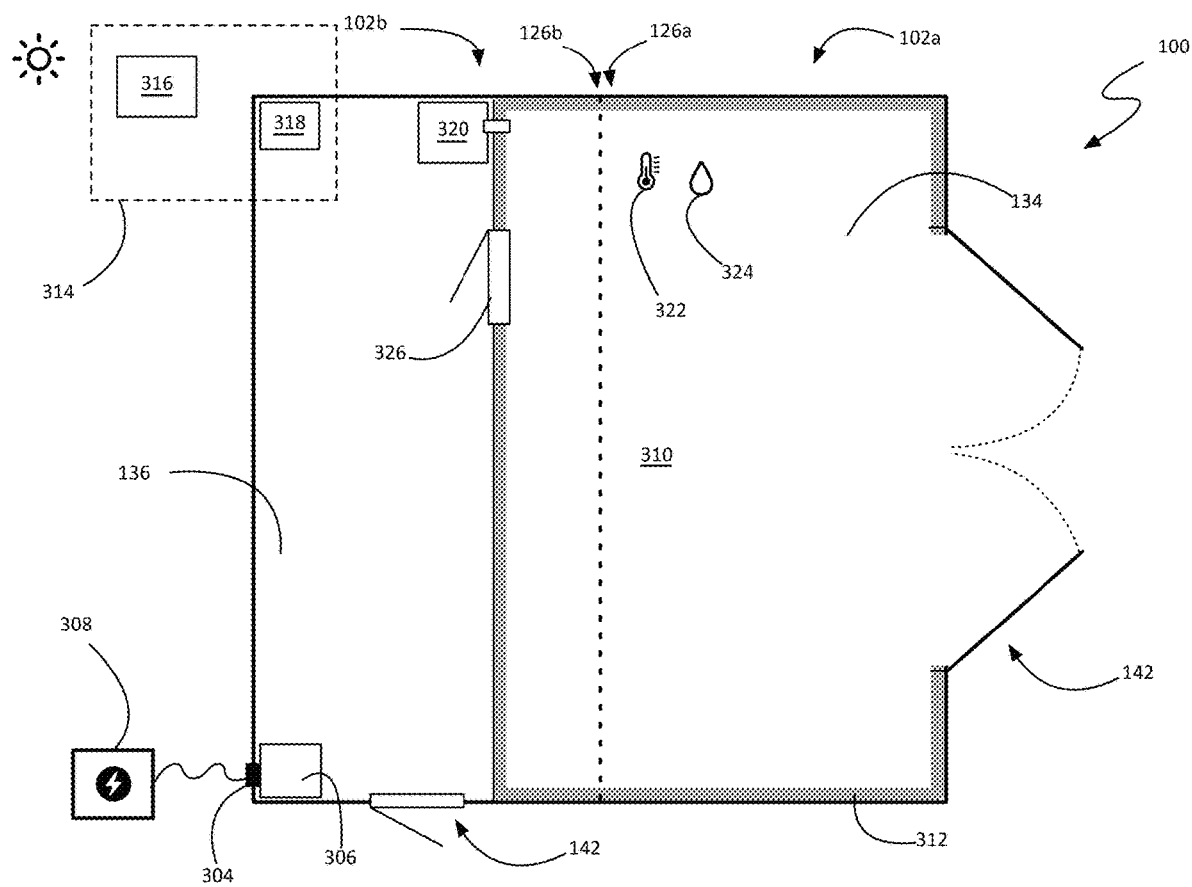
FIG. 3B shows a schematic top view of a deployable EMC testing laboratory with a semi-anechoic chamber.

FIGS. 3A and 3B show two non-limiting examples of different internal layouts of the contemplated deployable laboratory environment 100 with the modules in the deployed configuration 138, according to various implementations. It should be noted that while the following discussion is done in the context of a DLE 100 configured to be partitioned into a measurement compartment 134 and an instrumentation compartment 136 that are both shielded sufficient to meet an EMC testing standard when the modules are in the deployed configuration 138, other implementations may have one compartment, three compartments, or more, and the compartments may be configured to serve whatever purpose is needed for a particular use. The following two-compartment discussion is a non-limiting example of two related use cases, and not intended to illustrate a limitation of the contemplated DLE 100. Specifically, FIG. 3A shows a DLE 100 having a measurement compartment 134 configured to function as a reverberation chamber 300, while FIG. 3B shows a DLE 100 having a measurement compartment 134 configured to function as a semi-anechoic chamber 310.

In the context of the present description and the claims that follow, a measurement compartment 134 is a compartment where measurements take place, or where the focus of the examination is located during the testing. The instrumentation compartment 136 is where the measurements being performed in the measurement compartment 134 are monitored and controlled. In the non-limiting example being discussed here, the DLE 100 is configured for EMC testing. In some implementations, the instrumentation compartment 136 and/or the measurement compartment 134 may be shielded from each other, to protect sensitive test instrumentation from electromagnetic interference (EMI) generated either within the measurement compartment 134 or from external sources. This prevents measurement inaccuracies and ensures reliable operation of the instrumentation. In implementations configured for other uses, this partitioning may be revised to meet the needs specific for that particular use.

In some implementations, the DLE 100 is configured for EMC testing which may include, but is not necessarily limited to, conducted emissions (CE), conducted susceptibility/immunity (CS/CI), radiated emissions (RE), and radiated susceptibility/immunity (RS/RI) testing, as well as other EMC measurements. According to various implementations, when the first module 102a and the second module 102b are in deployed configuration 138, the measurement compartment 134 and instrumentation compartment 136 enclosed within is shielded sufficient to meet an EMC testing standard. Specifically, in some implementations, the shielding and applicable anechoic treatment or applicable mode stirring mechanism of one or both chambers is verified in accordance with, or meets or exceeds various applicable MC test standards including, but not limited to IEEE STD 299, ITSG-02, NSA 65, EC 61000-4-3, ANSI 63.4, CISPR 16-1-4, MIL-STD-461G, RTCA D0160 F/G, and CISPR 25, as well as other wireless and communication test standards such as 3GPP and CTIA. The shielding within the DLE 100 may be adjusted based on needs specific to a particular use, according to various implementations.

FIG. 3A is a top view of the internal layout of a non-limiting example of a DLE 100 having a reverberation chamber 300. Specifically, FIG. 3A shows a non-limiting example of a DLE 100 partitioned into a measurement compartment 134 and an instrumentation compartment 136, where the measurement compartment 134 is configured for use as a reverberation chamber 300. According to various implementations, the reverberation chamber 300 comprises at least one mode stirring device 302, as is known in the art. As an option, in some implementations, the compartments may comprise a signal passthrough, also known in the art.

Advantageously, in implementations where the modules are constructed from modified shipping containers, and are used for conducted tests, few if any modifications to the walls would be necessary for use as a reverberation chamber 300. Of course, the shielding and/or mode stirring equipment within the deployable laboratory environment 100 may be adjusted based on the needs of a particular use scenario. For example, the measurement compartment 134 may be configured to have a desired or sufficiently high Q-factor for the testing being performed.

FIG. 3A is a top view of the internal layout of a non-limiting example of a DLE 100 having a semi-anechoic chamber 310. Specifically, FIG. 3A shows a non-limiting example of a DLE 100 partitioned into a measurement compartment 134 and an instrumentation compartment 136, where the measurement compartment 134 is configured for use as an anechoic chamber 310 or semi-anechoic chamber 310. According to various implementations, the semi-anechoic chamber 310 comprises the measurement compartment 134 being lined with an absorber 312, as is known in the art. The shielding and/or anechoic treatment within the deployable laboratory environment 100 may be adjusted based on the needs of a particular use scenario.

According to various implementations, the partitioning of the interior of the modules may vary. In some implementations, including the non-limiting example shown in FIG. 3A, the interiors 130 of the first module 102a and the second module 102b may be partitioned such that, when in the deployed configuration 138, the measurement compartment 134 and the instrumentation compartment 136 each comprise the interiors 130 of the first module 102a and the second module 102b. In other words, the split between the two modules divides both compartments.

In other implementations, including the non-limiting example shown in FIG. 3B, the interiors 130 of the first module 102a and the second module 102b may be partitioned such that, when in the deployed configuration 138, the interior 130 of at least one of the first module 102a and the second module 102b comprises the entirety of one of the measurement compartment 134 or the instrumentation compartment 136 (see, for example, FIG. 3B). This arrangement may be advantageous for cases where more space is needed for the measurements (e.g., due to desired Q-factor or other EMC testing-related properties, the size of device being tested, etc.) than for the instrumentation.

The DLE 100 comprises at least one external door 142, permitting entrance to the laboratory when in the deployed configuration 138. In some implementations, the DLE 100 may comprise two external doors 142, with an external door 142 permitting entrance to the measurement compartment 134 and another external door 142 permitting entrance to the instrumentation compartment 136. As an option, the external door 142 may be a single leaf of a two-leaf door attached on the end, to allow testing of larger form factors.

In other implementations, the DLE 100 may comprise only a single external door 142, with the external door 142 leading into one of the instrumentation compartment 136 and the measurement compartment 134 when the first module 102a and the second module 102b are in the deployed configuration 138. The DLE 100 may also comprise an internal door 326 to allow passage between the two compartments. In the case where the measurement compartment 134 is configured for testing large devices, an external door 142 to the measurement compartment 134 may be sized so as to occupy a significant portion of one of the outside walls of the measurement compartment 134 to permit passage to devices too big to pass through a standard sized door.

In some implementations, including the non-limiting example shown in FIG. 3B, the DLE 100 may comprise an environmental control system 320 configured to control at least one of a temperature 322 and a humidity 324 within the instrumentation compartment 136 and the measurement compartment 134. The DLE 100 is constructed to be resistant to environmental conditions; the environmental control system 320 makes it possible to provide a stable, consistent measurement platform regardless of the environment in which the DLE 100 has been deployed. In some implementations, the environmental control system 320 may only operate when the modules are in the deployed configuration 138. In other implementations, the environmental control system 320 may be configured to continue operation, in at least some capacity, while the DLE 100 is traveling in the travel configuration 108 (e.g., powered by the truck pulling the foundation 104, powered by onboard power storage and/or production, etc.). In some cases, the DLE 100 may contain sensitive equipment that needs to be in an environment that is held within a particular range to prevent damage. In other cases, the DLE 100 may contain materials that may be easy to damage when exposed to ambient conditions outside the DLE 100 (e.g., the absorbing material, etc.). Having a controlled environment may help prevent damage to equipment, improve the consistency of test results, and prevent corrosion and/or biological growth.

According to various implementations, the DLE 100 is configured to receive power from an external power source 308. Specifically, in some implementations, at least one of the first module 102a and the second module 102b comprises a power receptacle 304 configured to be communicatively coupled to an external power source 308. As an option, the power receptacle 304 may provide electricity through a power filtering system 306 (i.e., system to filter the power to facilitate the powering of devices under test and to perform the requisite measurements without introducing additional sources of interference) to the measurement compartment 134 and the instrumentation compartment 136. Examples of an external power source 308 that may be coupled to the power receptacle 304 include a battery, a generator, an external connection to locally available power mains, and the like.

In some implementations, the DLE 100 may comprise a photovoltaic power system 314 having at least one photovoltaic cell 316. As an option, the photovoltaic power system 314 may also include a battery 318. In some implementations, this photovoltaic power system 314 may be used to power the testing operations of a deployed DLE 100. In other implementations, the photovoltaic power system 314 may be used to power various systems such as an environmental control system 320 while the DLE 100 is in transit (e.g., providing a temperature controlled environment without needing external power, etc.). As an option, the at least one photovoltaic cell 316 may be positioned on the roof 140.

Where the above examples, implementations and implementations reference examples, it should be understood by those of ordinary skill in the art that other transportation and laboratory devices and examples could be intermixed or substituted with those provided. In places where the description above refers to particular implementations of a deployable laboratory environment, it should be readily apparent that a number of modifications may be made without departing from the spirit thereof and that these implementations and implementations may be applied to other mobile or temporary environments as well. Accordingly, the disclosed subject matter is intended to embrace all such alterations, modifications and variations that fall within the spirit and scope of the disclosure and the knowledge of one of ordinary skill in the art.

What is claimed is:

1. A deployable laboratory environment, comprising:
   a foundation comprising a movement corridor;
   a first module and a second module that are each a partial shell with an interior and an exterior, the first module comprising a first longitudinal axis and a first junction side having at least one opening framed by a first interface, and the second module comprising a second longitudinal axis and a second junction side having at least one opening framed by a second interface;
   wherein the first module is rotatably coupled to the foundation through a first swivel joint, the second module is rotatably coupled to the foundation through a second swivel joint, and at least one of the first swivel joint and the second swivel joint is moveably coupled to the foundation and able to translate linearly along the movement corridor;
   wherein the first module and the second module are movable between a travel configuration and an intermediate configuration, and between the intermediate configuration and a deployed configuration;
   wherein the travel configuration comprises:
      the first longitudinal axis, the second longitudinal axis, and the movement corridor being substantially parallel to each other;
      the at least one opening of the first junction side being covered such that the interior of the first module is enclosed; and
      the at least one opening of the second junction side being covered such that the interior of the second module is enclosed;
   wherein the intermediate configuration comprises:
      the first longitudinal axis and the second longitudinal axis both being substantially perpendicular to the movement corridor;
      the first junction side and the second junction side facing each other;
      the interior of the first module and the second module being exposed;
   wherein the deployed configuration comprises the first module being releasably coupled to the second module such that the first interface is joined with the second interface and the interiors of the first module and the second module are combined and partitioned into a measurement compartment and an instrumentation compartment which are both shielded sufficient to meet an EMC testing standard.

2. The deployable laboratory environment of claim 1, further comprising:
   a first weather cover moveably coupled to the first module; and
   a second weather cover moveably coupled to the second module;
   wherein the first weather cover and the second weather cover are movable between the travel configuration and the intermediate configuration, and between the intermediate configuration and the deployed configuration;
   wherein the travel configuration comprises:
      the first weather cover covering the at least one opening of the first junction side such that the interior of the first module is enclosed;
      the second weather cover covering the at least one opening of the second junction side such that the interior of the second module is enclosed;
   wherein the intermediate configuration and the deployed configuration each comprise:
      the first weather cover moved away from the at least one opening of the first junction side such that the interior of the first module is exposed and the first interface is unobstructed by the first weather cover;
      the second weather cover moved away from the at least one opening of the second junction side such that the interior of the second module is exposed and the second interface is unobstructed by the second weather cover.

3. The deployable laboratory environment of claim 2, wherein:
   the first weather cover is moveably coupled to the first module through four pivot arms; and
   the second weather cover is moveably coupled to the second module through four pivot arms;
   wherein the intermediate configuration comprises:
      the first weather cover positioned above the first module;
      the second weather cover positioned above the second module;
   wherein the deployed configuration comprises:
      the first weather cover positioned above the first module and sloped;
      the second weather cover positioned above the second module and sloped; and
      the first weather cover coupled to the second weather cover to form a roof above and covering at least the first junction side and the second junction side.

4. The deployable laboratory environment of claim 1, wherein the measurement compartment and the instrumentation compartment each comprise the interiors of the first module and the second module.

5. The deployable laboratory environment of claim 1, wherein the first swivel joint and the second swivel joint are both moveably coupled to the foundation and able to translate linearly along the movement corridor.

6. The deployable laboratory environment of claim 1, wherein the measurement compartment is a reverberation chamber and comprises at least one mode stirring device.

7. The deployable laboratory environment of claim 1, wherein the measurement compartment is one of an anechoic chamber and a semi-anechoic chamber, the measurement compartment being lined with an absorber.

8. The deployable laboratory environment of claim 1, wherein one of the first module and the second module comprises a power receptacle configured to be communicatively coupled to an external power source, the power receptacle providing electricity through a power filtering system to the measurement compartment and the instrumentation compartment.

9. The deployable laboratory environment of claim 1, further comprising a photovoltaic power system, the photovoltaic power system comprising at least one photovoltaic cell and a battery.

10. The deployable laboratory environment of claim 1, wherein the movement corridor comprises at least one rail and wherein at least one of the first swivel joint and the second swivel joint is slidably coupled to the at least one rail of the movement corridor.

11. The deployable laboratory environment of claim 1, further comprising an environmental control system configured to control at least one of a temperature and a humidity level within the instrumentation compartment and the measurement compartment.

12. The deployable laboratory environment of claim 1, further comprising at most one external door, the external door leading into the instrumentation compartment when the first module and the second module are in the deployed configuration.

13. The deployable laboratory environment of claim 1, wherein the foundation is a wheeled trailer.

14. The deployable laboratory environment of claim 1, having a width of at most 8.5 feet and a height of at most 13.5 feet when the first module and the second module are in the travel configuration.

15. A deployable laboratory environment, comprising:
a foundation comprising a movement corridor;
a first module and a second module that are each a partial shell with an interior and an exterior, the first module comprising a first longitudinal axis and a first junction side having at least one opening framed by a first interface, and the second module comprising a second longitudinal axis and a second junction side having at least one opening framed by a second interface;
a first weather cover moveably coupled to the first module through four pivot arms; and
a second weather cover moveably coupled to the second module through four pivot arms;
wherein the first module is rotatably coupled to the foundation through a first swivel joint, the second module is rotatably coupled to the foundation through a second swivel joint, and at least one of the first swivel joint and the second swivel joint is moveably coupled to the foundation and able to translate linearly along the movement corridor;
wherein the first module, the first weather cover, the second module, and the second weather cover are movable between a travel configuration and an intermediate configuration, and between the intermediate configuration and a deployed configuration;
wherein the travel configuration comprises:
the first longitudinal axis, the second longitudinal axis, and the movement corridor being substantially parallel to each other;
the first weather cover covering the at least one opening of the first junction side such that the interior of the first module is enclosed;
the second weather cover covering the at least one opening of the second junction side such that the interior of the second module is enclosed;
wherein the intermediate configuration comprises:
the first longitudinal axis and the second longitudinal axis both being substantially perpendicular to the movement corridor;
the first junction side and the second junction side facing each other;
the first weather cover moved away from the at least one opening of the first junction side and positioned above the first module such that the interior of the first module is exposed and the first interface is unobstructed by the first weather cover;
the second weather cover moved away from the at least one opening of the second junction side and positioned above the second module such that the interior of the second module is exposed and the second interface is unobstructed by the second weather cover;
wherein the deployed configuration comprises:
the first module being releasably coupled to the second module such that the first interface is joined with the second interface and the interiors of the first module and the second module are combined and partitioned into a measurement compartment and an instrumentation compartment which are both shielded sufficient to meet an EMC testing standard;
the first weather cover positioned above the first module and sloped;
the second weather cover positioned above the second module and sloped;
the first weather cover coupled to the second weather cover to form a roof above and covering at least the first junction side and the second junction side;
wherein the foundation is a wheeled trailer;
wherein the deployable laboratory environment has a width of at most 8.5 feet and a height of at most 13.5 feet when the first module and the second module are in the travel configuration.

16. The deployable laboratory environment of claim 15, wherein the first swivel joint and the second swivel joint are both moveably coupled to the foundation and able to translate linearly along the movement corridor.

17. The deployable laboratory environment of claim 15, wherein the measurement compartment is a reverberation chamber and comprises at least one mode stirring device.

18. The deployable laboratory environment of claim 15, wherein the measurement compartment is one of an anechoic chamber and a semi-anechoic chamber, the measurement compartment being lined with an absorber.

19. The deployable laboratory environment of claim 15, further comprising a photovoltaic power system, the photovoltaic power system comprising at least one photovoltaic cell and a battery.

20. The deployable laboratory environment of claim 15, wherein the movement corridor comprises at least one rail and wherein at least one of the first swivel joint and the second swivel joint is slidably coupled to the at least one rail of the movement corridor.

* * * * *